(12) United States Patent
Matsuyama et al.

(10) Patent No.: US 7,030,364 B2
(45) Date of Patent: Apr. 18, 2006

(54) OPTICAL DETECTION SENSOR

(75) Inventors: Toshiyasu Matsuyama, Ohtsu (JP);
Kiyofumi Fukuda, Ohtsu (JP);
Yasuhiro Takada, Ohtsu (JP)

(73) Assignee: Optex Co., Ltd., Shiga (JP)

( * ) Notice: Subject to any disclaimer, the term of this patent is extended or adjusted under 35 U.S.C. 154(b) by 167 days.

(21) Appl. No.: 10/714,611

(22) Filed: Nov. 18, 2003

(65) Prior Publication Data

US 2005/0035277 A1    Feb. 17, 2005

(30) Foreign Application Priority Data

Nov. 18, 2002    (JP) .............................. 2002-333704

(51) Int. Cl.
*G01V 9/04*    (2006.01)
(52) U.S. Cl. ....................................... 250/221; 340/556
(58) Field of Classification Search ................ 250/222, 250/342, 221; 340/555, 556
See application file for complete search history.

(56) References Cited

U.S. PATENT DOCUMENTS 4,310,756 A * 1/1982 Sick ........................... 250/221
4,652,205 A * 3/1987 Ross .......................... 700/259

* cited by examiner

*Primary Examiner*—David Porta
*Assistant Examiner*—Tony Ko
(74) *Attorney, Agent, or Firm*—Wenderoth, Lind & Ponack, L.L.P.

(57) ABSTRACT

Sensor(s) may be such that light-projecting component(s) and light-receiving component(s) are arranged therein. Furthermore, such sensor(s) may be provided with optical path varying means for varying projected light optical path(s) and/or received light optical path(s) so as to physically vary overlapping zone(s) in which the projected light optical path(s) and the received light optical path(s) at least partially overlap. The optical path varying means may carry out adjustment of optical sensitivity by increasing the extent(s) of the overlapping zone(s) when carrying out detection with respect to zone(s) distant from such sensor(s) and/or decreasing the extent(s) of the overlapping zone(s) when carrying out detection with respect to zone(s) proximate to such sensor(s).

4 Claims, 4 Drawing Sheets

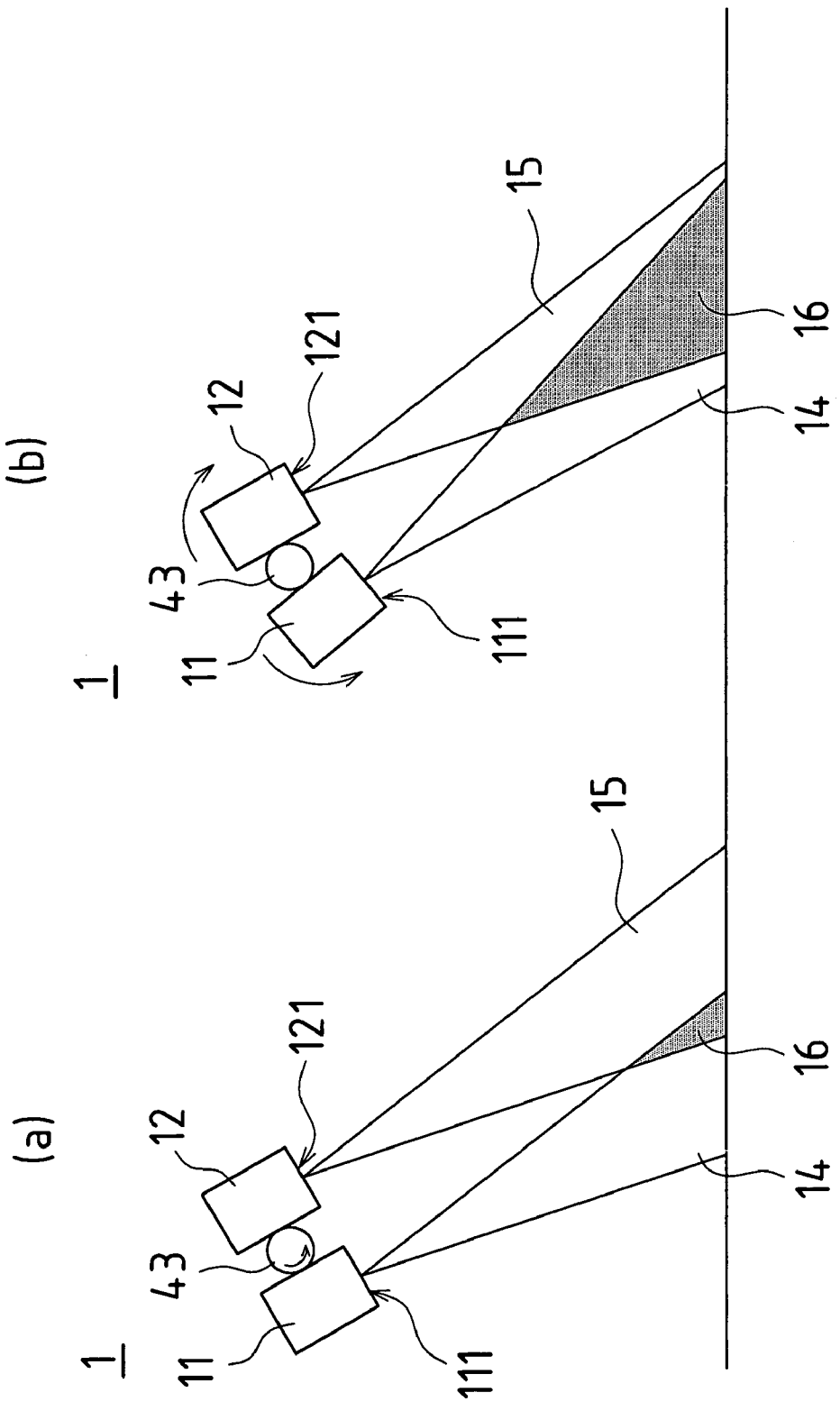

OPTICAL DETECTION SENSOR

BACKGROUND OF THE INVENTION

This Nonprovisional application claims priority under 35 U.S.C. § 119(a) to patent Application No. 2002-333704 filed in Japan on Nov. 18, 2002, the entire contents of which are hereby incorporated by reference.

1. Field of the Invention

The present invention pertains to a sensor for detecting the entry of object(s) into overlapping zone(s) at which projected light optical path(s) of light irradiated from light-projecting component(s) overlap received light optical path(s) of light incident on light-receiving component(s).

2. Description of the Related Art

Conventional sensors include automatic door sensors having the ability to vary the protected zone for the detection of persons traveling therethrough, as disclosed, for example, in Japanese Patent Application Publication Kokai No. H3-55381 (1991).

In this automatic door sensor, a light-projecting component and a light-receiving component are disposed above an automatic door. A two-piece rotatable mirror is employed as a reflecting mirror to reflect light irradiated from the light-projecting component. The reflecting mirror splits the light irradiated from the light-projecting component into two beams which irradiate the floor, forming a first zone proximate to the door, and a second zone which is removed (distant) from this first zone. Furthermore, a two-piece rotatable reflecting mirror is provided at the light-receiving component on which reflected light from this first zone and this second zone is incident, and reflected light beams from the first zone and the second zone are respectively received by the light-receiving component.

In this automatic door sensor, because the light-projecting and light-receiving components respectively employ rotatable reflecting mirrors, it is possible, through adjustment of the rotational angles of these reflecting mirrors, to simultaneously relocate the first zone and the second zone.

Now, it is generally the case with automatic door sensors that the density of the light irradiated from the light-projecting component will be highest near the automatic door sensor, and will decrease as one goes outside of that region and approaches regions peripheral thereto. Furthermore, if the distance between the light-projecting component and the light-receiving component arranged therein is varied, then, by holding the density of the light irradiated from the light-projecting component constant, the density of the light irradiated from the light-projecting component will decrease as the distance between the two is increased.

Using the automatic door sensor disclosed in Japanese Patent Application Publication Kokai No. H3-55381 (1991) as an example to illustrate this fact, the optical path length of the light beam arriving at the light-receiving component after reflection from the (peripheral) second zone will be longer than that of the light beam arriving at the light-receiving component after reflection from the first zone (near the light-projecting component). For this reason, while it is possible with this automatic door sensor to vary protected zones so as to form arbitrary protected zones (first zone(s) and second zone(s)), it is not possible to carry out a detection of objects entering protected zones such that equivalent light density, i.e., optical sensitivity, is used for detection thereof across all protected zones. For this reason, taking detection in the first zone as the reference, it will sometimes be the case that the low light density and low optical sensitivity in the second zone will prevent detection thereat. Alternatively, taking detection in the second zone as the reference, the high light density and high optical sensitivity in the first zone will sometimes cause faulty operation such that objects not intended for detection, e.g., paper lying on the ground or the like, are detected thereat.

In order to solve one or more of the aforementioned problems, it is therefore an object of the present invention to provide a sensor having an ability to vary protected zone(s) at which detection of person(s) traveling therethrough and/or other such object(s) are detected, and for carrying out the detection of object(s) entering protected zone(s) such that the detection thereof is carried out with equivalent optical sensitivity across all protected zones despite any varying of protected zone(s).

SUMMARY OF THE INVENTION

In order to achieve the foregoing object and/or other objects, a sensor associated with one or more embodiments of the present invention comprises one or more light-projecting components for irradiating light from one or more light-projecting surfaces, and one or more light-receiving components for receiving at least a portion of the light irradiated from at least one of the light-projecting component(s), where the received light is incident on one or more light-receiving surfaces of the light-receiving component(s) after having been reflected. The sensor detects one or more objects in one or more overlapping zones at which at least one projected light optical path of the light irradiated by at least one of the light-projecting component(s) at least partially overlaps at least one received light optical path of the light incident on at least one of the light-receiving component(s). The sensor further comprising one or more optical path varying means for varying at least one of the projected light optical path(s) and/or at least one of the received light optical path(s) so as to physically vary at least one of the overlapping zone(s). At least one of the optical path varying means carries out adjustment of optical sensitivity by increasing at least one extent of at least one of the overlapping zone(s) when carrying out detection with respect to at least one distant zone and/or decreasing at least one extent of at least one of the overlapping zone(s) when carrying out detection with respect to at least one proximate zone.

In accordance with such embodiment(s) of the present invention, because the optical path varying means is/are provided, adjustment of optical sensitivity may be carried out by increasing the extent(s) of the overlapping zone(s) when carrying out detection with respect to a zone(s) distant from such sensor(s) and/or decreasing the extent(s) of the overlapping zone(s) when carrying out detection with respect to a zone(s) proximate to such sensor(s). That is, because light density is high when carrying out detection with respect to the zone(s) proximate to such sensor(s), adjustment of optical sensitivity may be carried out so as to decrease the extent(s) of the overlapping zone(s). Furthermore, because light density is low when carrying out detection with respect to the zone(s) distant from such sensor(s), adjustment of optical sensitivity may be carried out so as to increase the extent(s) of the overlapping zone(s). As a result, it will be possible to carry out detection of an object(s) entering the overlapping zone(s) such that detection thereof is carried out with equivalent optical sensitivity across all overlapping zones despite any varying of the overlapping zone(s).

Furthermore, because optical path varying means may physically vary overlapping zone(s), it is possible to reduce a manufacturing cost as compared with the alternative of electrically varying the overlapping zone(s), as there is no need to develop and provide additional controller(s) for varying the overlapping zone(s).

More specifically, in the foregoing constitution, at least one of the optical path varying means may be such that one or more translucent curved bodies is/are disposed in at least one of the projected and/or received light optical path(s). At least one of the translucent curved body or bodies comprises one or more flat components and one or more curved components formed in continuous fashion. At least one of the light-projecting component(s) and at least one of the light-receiving component(s) are arrayed in the same order as at least one of the flat component(s) and at least one of the curved component(s) formed in continuous fashion. When carrying out detection with respect to at least one distant zone, at least one of the light-projecting component(s) and at least one of the light-receiving component(s) are made to move and/or rotate from at least one of the flat component(s) and toward at least one of the curved component(s) while maintaining distance between at least a portion of the light-projecting and light-receiving surfaces of the light-projecting and light-receiving components.

Alternatively, or in addition thereto, at least one of the optical path varying means may be such that one or more prismatic bodies is/are disposed in at least one of the projected and/or received light optical path(s). At least one of the prismatic body or bodies presents gradually increasing angle(s) as one goes from at least one side of the one or more prismatic body or bodies to at least one other side thereof. At least one of the light-projecting component(s) and at least one of the light-receiving component(s) are arrayed in the same order as the at least one side of the one or more prismatic body or bodies and the at least one other side thereof. When carrying out detection with respect to at least one distant zone, at least one of the light-projecting component(s) and at least one of the light-receiving component(s) are made to move and/or rotate from the at least one side thereof and toward the at least one other side thereof while maintaining distance between at least a portion of the light-projecting and light-receiving surfaces of the light-projecting and light-receiving components.

Alternatively, or in addition thereto, at least one of the optical path varying means may be such that one or more mirror bodies is/are disposed in at least one of the projected and/or received light optical path(s). At least one of the mirror body or bodies comprises one or more flat components and one or more curved components formed in continuous fashion. At least one of the light-projecting component(s) and at least one of the light-receiving component(s) are arrayed in the same order as at least one of the flat component(s) and at least one of the curved component(s) formed in continuous fashion. When carrying out detection with respect to at least one distant zone, at least one of the light-projecting component(s) and at least one of the light-receiving component(s) are made to move and/or rotate from at least one of the flat component(s) and toward at least one of the curved component(s) while maintaining distance between at least a portion of the light-projecting and light-receiving surfaces of the light-projecting and light-receiving components.

Alternatively, or in addition thereto, at least one of the optical path varying means may be such that one or more rotatable shafts for rotating at least one of the light-projecting component(s) and at least one of the light-receiving component(s) is/are disposed between at least one of the light-projecting component(s) and at least one of the light-receiving component(s). When carrying out detection with respect to at least one distant zone, at least one of the light-projecting component(s) and/or at least one of the light-receiving component(s) is or are rotated in at least one direction such as would tend to increase the degree to which at least one of the light-projecting surface(s) face(s) at least one of the light-receiving surface(s).

Adoption of the foregoing specific optical path varying means constitution(s) makes it possible to eliminate the need to provide additional member(s) that might be arranged therein only with difficulty. As a result, it is possible to reduce the parts count of the sensor and/or simplify the structure of the sensor.

BRIEF DESCRIPTION OF DRAWINGS

FIG. 1 (*b*) is a schematic diagram of the principal parts of the sensor of the first embodiment, shown at a time when detection is being carried out with respect to a distant zone.

FIG. 2 (*b*) is a schematic diagram of the principal parts of the sensor of the second embodiment, shown at a time when detection is being carried out with respect to a distant zone.

FIG. 3 (*b*) is a schematic diagram of the principal parts of the sensor of the third embodiment, shown at a time when detection is being carried out with respect to a distant zone.

FIG. 4 (*a*) is a schematic diagram of the principal parts of a sensor associated with a fourth embodiment of the present invention, shown at a time when detection is being carried out with respect to a proximate zone. FIG. 4 (*b*) is a schematic diagram of the principal parts of the sensor of the fourth embodiment, shown at a time when detection is being carried out with respect to a distant zone.

DETAILED DESCRIPTION OF THE PREFERRED EMBODIMENTS

Below, embodiments of the present invention are described with reference to the drawings. Note that while the following embodiments apply the present invention to an automatic door sensor, this being one type of sensor, the present invention is not limited thereto. It is possible to apply the present invention to sensors used in other fields, e.g., security sensors and the like.

First Embodiment

Figure 1:
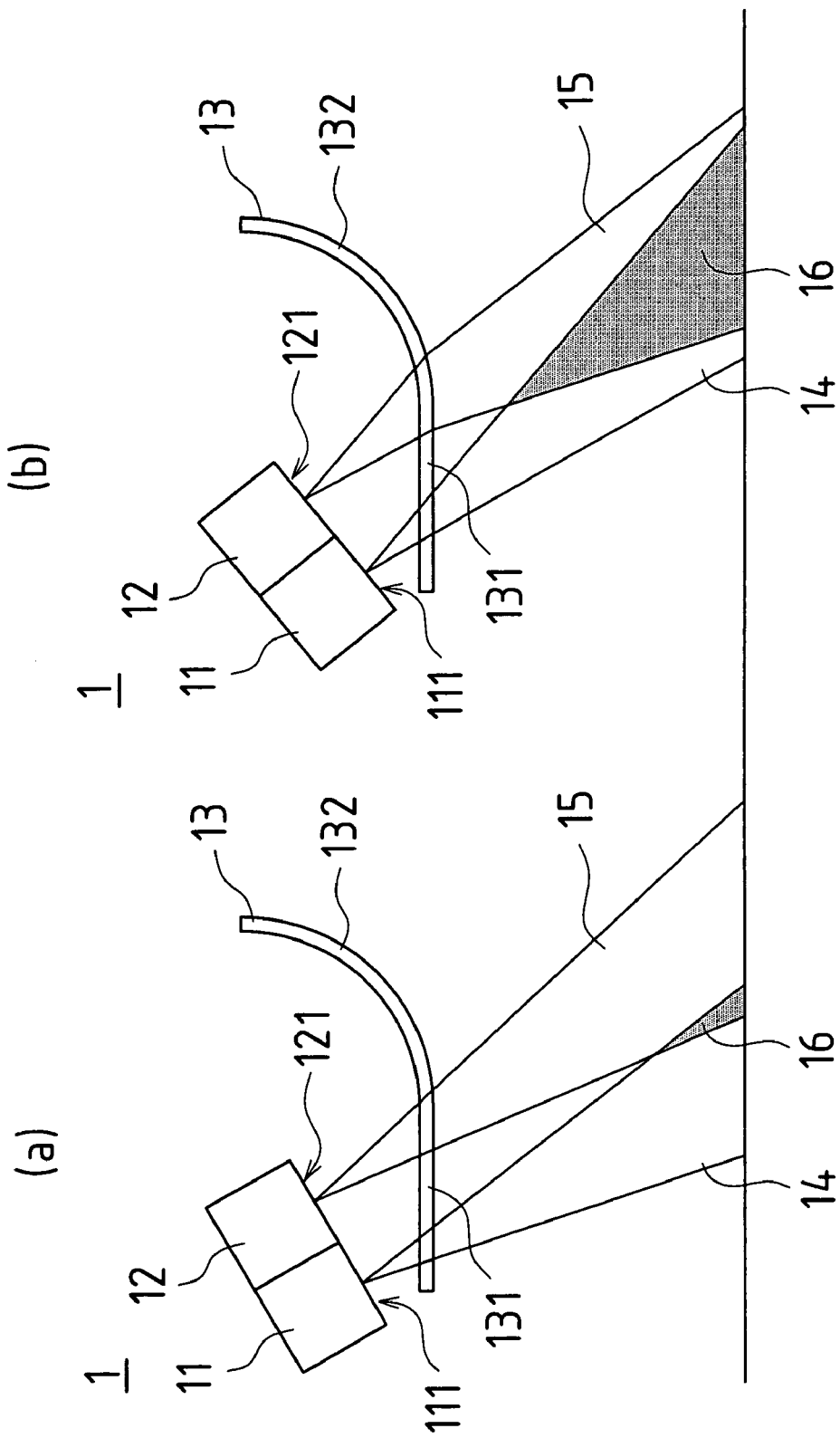
FIG. 1 (*a*) is a schematic diagram of the principal parts of a sensor associated with a first embodiment of the present invention, shown at a time when detection is being carried out with respect to a proximate zone.

As shown in FIG. 1, an automatic door sensor 1 is such that light-projecting component(s) 11 irradiate(s) light from light-projecting surface(s) 111, and light-receiving component(s) 12 receive(s) light that is irradiated from such light-projecting component(s) 11. The received light is incident on light-receiving surface(s) 121 after the irradiated light has been reflected. The light-projecting component(s) 11 and the light-receiving component(s) 12 are arrayed vertically at the time that this automatic door sensor 1 is installed. Furthermore, at this automatic door sensor 1, cover(s) is/are employed at housing surface(s) facing the light-projecting and light-receiving surfaces 111, 121 for allowing light to be irradiated from the light-projecting component 11 and incident on light-receiving component 12. Note also that detection conditions are such that constant density is maintained in the light irradiated from light-projecting surface 111 of light-projecting component 11.

In accordance with such a constitution, this automatic door sensor 1 is such that object(s) is/are detected at overlapping zone(s) 16 at which projected light optical path(s) 14 of light that is irradiated from the light-projecting component(s) 11 and transmitted through cover(s) overlaps received light optical path(s) 15 of light that is transmitted through cover(s) and incident on light-receiving component(s) 12.

Furthermore, such automatic door sensor 1 may be provided with optical path varying means for varying the projected light optical path(s) 14 and/or the received light optical path(s) 15 so as to physically vary the overlapping zone(s) 16. Such optical path varying means may carry out an adjustment of optical sensitivity by increasing the extent(s) of the overlapping zone(s) 16 (see FIG. 1 (*b*)) when carrying out detection with respect to zone(s) that are distant (distant zone(s)) from the automatic door sensor 1 and/or decreasing the extent(s) of the overlapping zone(s) 16 (see FIG. 1 (*a*)) when carrying out detection with respect to zone(s) that are proximate (proximate zone(s)) to the automatic door sensor 1.

As shown in FIG. 1, the present optical path varying means is such that a translucent curved body 13 is disposed in the projected and received light optical paths 14, 15. The translucent curved body 13 comprises a flat component 131 and a curved component 132 formed in continuous fashion. Furthermore, the light-projecting component 11 and the light-receiving component 12 are arrayed such that the light-projecting component 11 is on the same side as the flat component 131 of the translucent curved body 13, and the light-receiving component 12 is on the same side as the curved component 132 thereof. Moreover, when carrying out detection with respect to zone(s) distant from this automatic door sensor 1, the light-projecting and light-receiving surfaces 111, 121 of the light-projecting and light-receiving components 11, 12 are rotated from the flat component 131 of the translucent curved body 13 toward the curved component 132 of the translucent curved body 13 while maintaining the distance between the light-projecting and light-receiving surfaces 111, 121 of the light-projecting and light-receiving components 11, 12. Note that this translucent curved body 13 may also be employed as the translucent cover which is the housing of this automatic door sensor 1.

Next, with reference to FIG. 1, an operation of the automatic door sensor 1 when carrying out detection with respect to a zone which is proximate to this automatic door sensor 1, and an operation of the automatic door sensor 1 when carrying out detection with respect to a zone which is distant from this automatic door sensor 1 will be described.

First, when carrying out detection with respect to a zone which is proximate to this automatic door sensor 1, the light-projecting and light-receiving components 11, 12 are both disposed so as to cause the light-projecting and light-receiving surfaces 111, 121 to be directed toward the flat component 131 of translucent curved body 13.

With the sensor 1 in this state, light that is irradiated from the light-projecting component 11 follows the projected light optical path 14 and is transmitted through the flat component 131. Of this irradiated light, only that portion which is irradiated along the received light optical path 15, i.e., only that portion which irradiates overlapping zone 16—at which the projected light optical path 14 overlaps the received light optical path 15—is reflected. This reflected light is transmitted through the translucent curved body 13 and is incident on the light-receiving surface 121, being received by the light-receiving component 12. As shown at FIG. 1 (*a*), the extent of the overlapping zone 16 at this time is small.

Next, when carrying out detection with respect to a zone which is distant from this automatic door sensor 1, the light-projecting and light-receiving components 11, 12 are both rotated from the flat component 131 of the translucent curved body 13 toward the curved component 132 of the translucent curved body 13. At such time, the light-receiving surface 121 of the light-receiving component 12 is disposed so as to be directed at the curved component 132, and the light-projecting surface 111 of the light-projecting component 11 is disposed so as to be directed at the flat component 131.

With the sensor 1 in this state, light that is irradiated from the light-projecting component 11 follows the projected light optical path 14 and is transmitted through the flat component 131. Of this irradiated light, only that portion which is irradiated along the received light optical path 15, i.e., only that portion which irradiates overlapping zone 16—at which the projected light optical path 14 overlaps the received light optical path 15—is reflected. This reflected light is transmitted through the translucent curved body 13 and is incident on the light-receiving surface 121, being received by the light-receiving component 12. At such time, the light incident on the light-receiving surface 121 is refracted by the curved component 132, and the received light optical path 15 undergoes refraction as indicated in FIG. 1 (*b*). Furthermore, as shown in FIG. 1 (*b*), the extent of the overlapping zone 16 at this time is large.

As described above, in accordance with the present automatic door sensor 1, because the translucent curved body 13 is provided, an adjustment of optical sensitivity may be carried out by increasing the extent(s) of the overlapping zone(s) 16 when carrying out detection with respect to zone(s) distant from this automatic door sensor 1 and/or decreasing the extent(s) of the overlapping zone(s) 16 when carrying out detection with respect to zone(s) proximate to this automatic door sensor 1. That is, because light density is high when carrying out detection with respect to zone(s) proximate to this automatic door sensor 1, adjustment of optical sensitivity may be carried out so as to decrease the extent(s) of the overlapping zone(s) 16; and because light density is low when carrying out detection with respect to zone(s) distant from this automatic door sensor 1, adjustment of optical sensitivity may be carried out so as to increase the extent(s) of the overlapping zone(s) 16. As a result, it will be possible to carry out detection of object(s) entering overlapping zone(s) 16 such that the detection thereof is carried out with equivalent optical sensitivity across all overlapping zones 16 despite any varying of the overlapping zone(s) 16.

Furthermore, because the translucent curved body 13 physically varies the overlapping zone(s) 16, it is possible to reduce a manufacturing cost as compared with the alternative of electrically varying the same, as there is no need to develop and provide additional controller(s) for varying the overlapping zone(s) 16.

Furthermore, because the translucent curved body 13 is provided therein, this automatic door sensor 1 makes it possible to eliminate the need to provide additional member(s) that might be arranged therein only with difficulty. As a result, it is possible to reduce the parts count (number of parts) of the automatic door sensor 1 and/or simplify the structure of the automatic door sensor 1.

Note also that whereas in the present first embodiment the translucent curved body 13 is employed as the cover which is the housing of the automatic door sensor 1, the present invention is not limited thereto. It is possible, for example, to separately provide the same at the interior of the housing, provided only that the same be disposed in the projected and/or received light optical paths 14, 15.

Furthermore, whereas the translucent curved body 13 was disposed in the projected and received light optical paths 14, 15, the present invention is not limited thereto. It is possible, for example, to dispose the translucent curved body 13 only in the projected light optical path 14, thereby varying the extent(s) of the overlapping zone(s) 16 by refracting only the projected light optical path 14.

Furthermore, whereas the light-projecting component 11 and the light-receiving component 12 were arrayed such that the light-projecting component 11 was on the same side as the flat component 131 of the translucent curved body 13, and the light-receiving component 12 was on the same side as the curved component 132 of the translucent curved body 13, the present invention is not limited thereto. It is possible, for example, for the light-projecting component 11 and the light-receiving component 12 to be arrayed such that the light-receiving component 12 is on the same side as the flat component 131 of the translucent curved body 13, and the light-projecting component 11 is on the same side as the curved component 132 of the translucent curved body 13.

Furthermore, whereas the light-projecting component 11 and the light-receiving component 12 were arrayed vertically at the time that the automatic door sensor 1 was installed, the present invention is not limited thereto. It is possible, for example, to array the light-projecting component 11 and the light-projection component 12 horizontally, provided only that the light-projecting component 11 and the light-receiving component 12 are rotated from the flat component 131 of translucent curved body 13 toward the curved component 132 of the translucent curved body 13 while maintaining the distance between the light-projecting and light-receiving surfaces 111, 121 of the light-projecting and light-receiving components 11, 12.

Furthermore, whereas the light-projecting component 11 and the light-receiving component 12 were rotated from the flat component 131 of the translucent curved body 13 toward the curved component 132 thereof, the present invention is not limited thereto. It is possible for the light-projecting component 11 and the light-receiving component 12 to be moved from the flat component 131 of the translucent curved body 13 toward the curved component 132.

Automatic door sensors associated with other embodiments of the present invention having an operation and effect similar to the automatic door sensor 1 associated with the present first embodiment will now be described.

Second Embodiment

The automatic door sensor of the second embodiment of the present invention differs from the automatic door sensor of the foregoing first embodiment only with respect to the optical path varying means, and the other constitutions thereof are identical in other respects. A description of the present second embodiment will therefore be confined to the optical path varying means with respect to the manner in which it differs from the automatic door sensor of the first embodiment, and like constituents will be assigned like reference numerals and a description thereof will be omitted.

Figure 2:
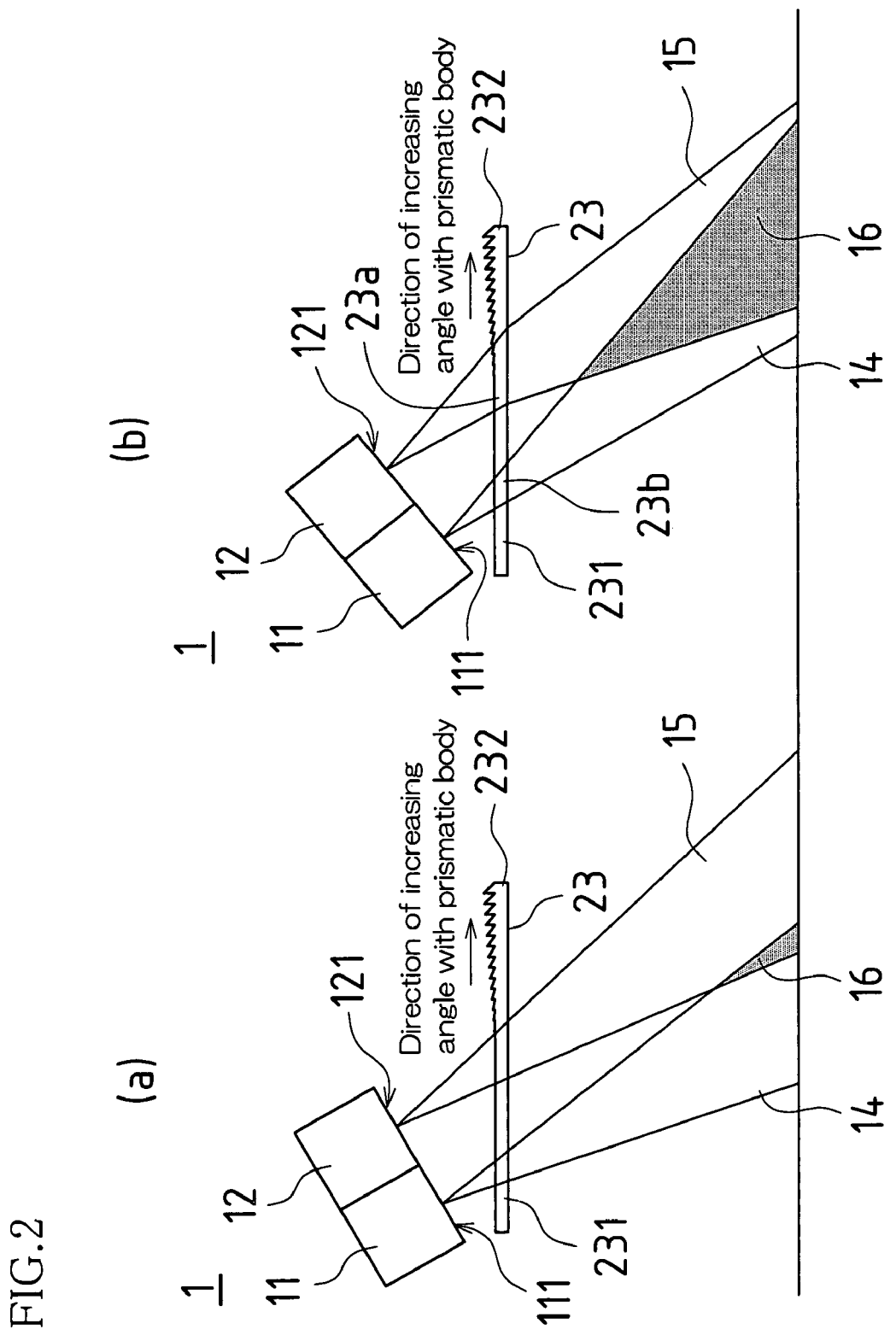
FIG. 2 (*a*) is a schematic diagram of the principal parts of a sensor associated with a second embodiment of the present invention, shown at a time when detection is being carried out with respect to a proximate zone.

As shown in FIG. 2, a light-projecting component 11 and a light-receiving component 12 are arranged in the automatic door sensor 1, and cover(s) are employed at housing surface(s) facing light-projecting and light-receiving surfaces 111, 121 of these light-projecting and light-receiving components 11, 12. Note also that detection conditions are such that constant density is maintained in the light irradiated from the light-projecting surface 111 of the light-projecting component 11.

Furthermore, this automatic door sensor 1 may be provided with optical path varying means for varying a projected light optical path(s) 14 and/or a received light optical path(s) 15 so as to physically vary an overlapping zone(s) 16.

As shown in FIG. 2, the present optical path varying means is such that a prismatic body 23 is disposed in the projected and received light optical paths 14, 15. The prismatic body 23 presents gradually increasing angles as one goes from one side 231 (left side in FIG. 2) of the prismatic body 23 to the other side 232 (right side FIG. 2) thereof. Furthermore, the light-projecting component 11 and the light-receiving component 12 are arrayed in the order "light-projecting component 11 to light-receiving component 12" as one goes from the one side 231 thereof to the other side 232 thereof. Moreover, when carrying out detection with respect to zone(s) distant from this automatic door sensor 1, the light-projecting and the light-receiving surfaces 111, 121 of the light-projecting and light-receiving components 11, 12 are rotated from the one side 231 of the prismatic body 23 to the other side 232 thereof while maintaining the distance between the light-projecting and light-receiving surfaces 111, 121 of the light-projecting and light-receiving components 11, 12. Note that this prismatic body 23 may also be employed as the translucent cover which is the housing of this automatic door sensor 1.

Next, with reference to FIG. 2, an operation of the automatic door sensor 1 when carrying out detection with respect to a zone which is proximate to this automatic door sensor 1, and an operation of the automatic door sensor 1 when carrying out detection with respect to a zone which is distant from this automatic door sensor 1 will be described.

First, when carrying out detection with respect to a zone which is proximate to this automatic door sensor 1, the light-projecting component 11 and the light-receiving component 12 are disposed so as to cause the light-projecting and light-receiving surfaces 111, 121 to be directed toward the prismatic body 23 in the order "light-projecting component 11 to light-receiving component 12" as one goes from the one side 231 of the prismatic body 23 to the other side 232 thereof.

With the sensor 1 in this state, light that is irradiated from the light-projecting component 11 follows the projected light optical path 14 and is transmitted through the prismatic body 23. Of this irradiated light, only that portion which is irradiated along the received light optical path 15, i.e., only that portion which irradiates the overlapping zone 16—at which projected the light optical path 14 overlaps the received light optical path 15—is reflected. This reflected light is transmitted through the prismatic body 23 and is incident on the light-receiving surface 121, being received by the light-receiving component 12 (see FIG. 2 (*a*)).

Next, when carrying out detection with respect to a zone which is distant from this automatic door sensor 1, the light-projecting and light-receiving components 11, 12 are both rotated from the one side 231 of the prismatic body 23 to the other side 232 thereof. At such time, the light-receiving surface 121 of the light-receiving component 12 is disposed so as to be directed at certain angular part(s) 23a of the prismatic body 23, and the light-projecting surface 111 of the light-projecting component 11 is disposed so as to be directed at certain nonangular part(s) 23b of the prismatic body 23 (see FIG. 2 (b)).

With the sensor 1 in this state, light that is irradiated from the light-projecting component 11 follows the projected light optical path 14 and is transmitted through the prismatic body 23. Of this irradiated light, only that portion which is irradiated along the received light optical path 15, i.e., only that portion which irradiates the overlapping zone 16—at which the projected light optical path 14 overlaps the received light optical path 15—is reflected. This reflected light is transmitted through the prismatic body 23 and is incident on the light-receiving surface 121, being received by the light-receiving component 12. At such time, the light incident on the light-receiving surface 121 is refracted by the prismatic body 23, and the received light optical path 15 undergoes refraction as indicated in FIG. 2 (b).

Third Embodiment

The automatic door sensor of the third embodiment of the present invention differs from the automatic door sensor of the foregoing first embodiment only with respect to the optical path varying means, and the other constitutions thereof are identical in other respects. A description of the present third embodiment will therefore be confined to the optical path varying means with respect to the manner in which it differs from the automatic door sensor of the first embodiment, and like constituents will be assigned like reference numerals and a description thereof will be omitted.

Figure 3:
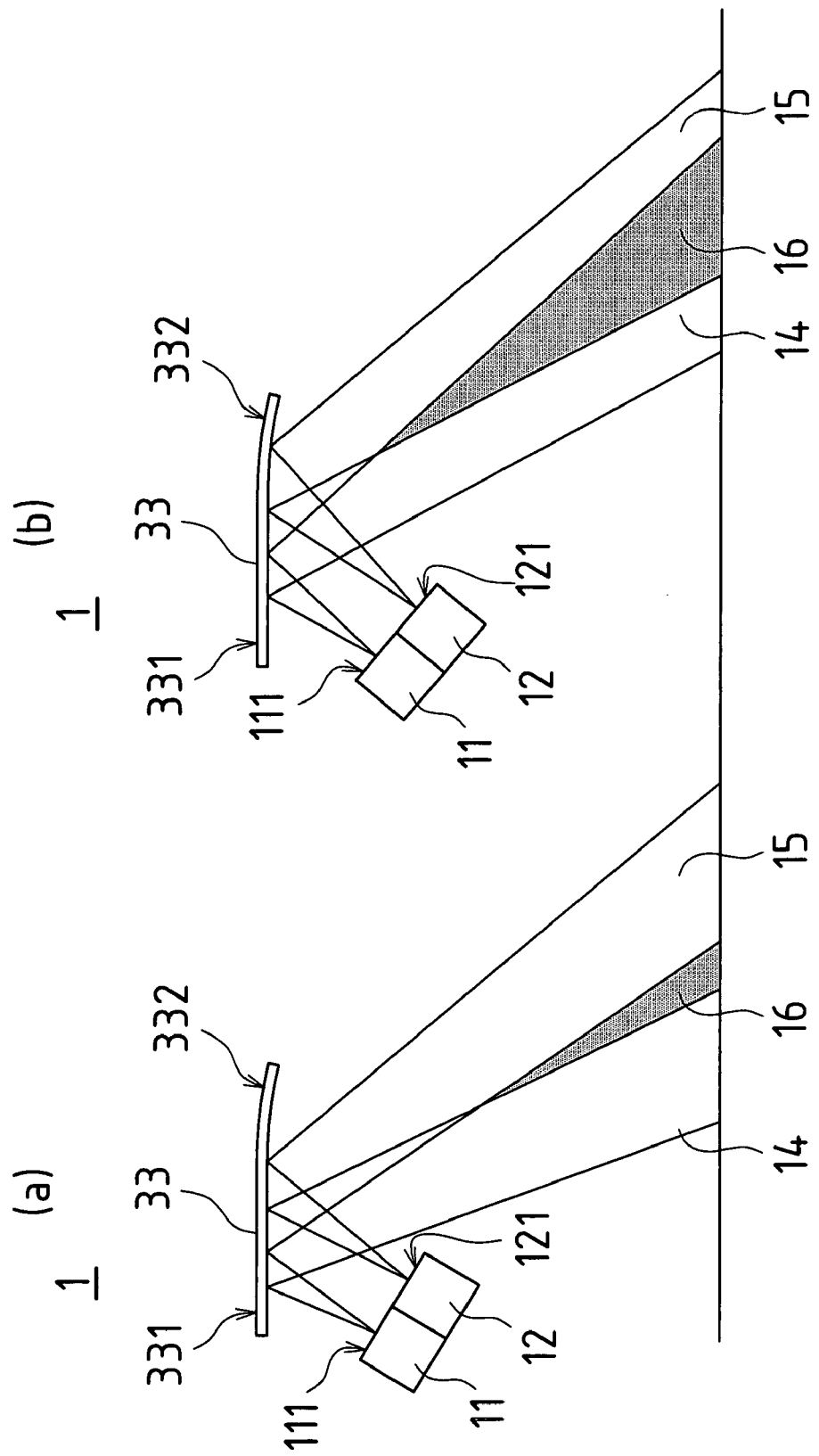
FIG. 3 (*a*) is a schematic diagram of the principal parts of a sensor associated with a third embodiment of the present invention, shown at a time when detection is being carried out with respect to a proximate zone.

As shown in FIG. 3, a light-projecting component 11 and a light-receiving component 12 are arranged in the automatic door sensor 1. Note also that detection conditions are such that constant density is maintained in the light irradiated from the light-projecting surface 111 of the light-projecting component 11.

Furthermore, this automatic door sensor 1 may be provided with optical path varying means for varying a projected light optical path(s) 14 and/or a received light optical path(s) 15 so as to physically vary an overlapping zone(s) 16.

As shown in FIG. 3, the present optical path varying means is such that a mirror 33 is disposed in the projected and received light optical paths 14, 15. The mirror 33 comprises a flat component 331 and a curved component 332 formed in continuous fashion. Furthermore, the light-projecting component 11 and the light-receiving component 12 are arrayed such that the light-projecting component 11 is on the same side as the flat component 331 of the mirror 33, and the light-receiving component 12 is on the same side as the curved component 332 of the mirror 33. Moreover, when carrying out detection with respect to zone(s) distant from this automatic door sensor 1, the light-projecting and light-receiving surfaces 111, 121 of the light-projecting and light-receiving components 11, 12 are rotated from the flat component 331 of the mirror 33 toward the curved component 332 thereof while maintaining the distance between the light-projecting and light-receiving surfaces 111, 121 of the light-projecting and light-receiving components 11, 12.

Next, with reference to FIG. 3, an operation of the automatic door sensor 1 when carrying out detection with respect to a zone which is proximate to this automatic door sensor 1, and an operation of the automatic door sensor 1 thereof when carrying out detection with respect to a zone which is distant from this automatic door sensor 1 will be described.

First, when carrying out detection with respect to a zone which is proximate to this automatic door sensor 1, the light-projecting component 11 and the light-receiving component 12 are disposed so as to cause the light-projecting and light-receiving surfaces 111, 121 to be directed toward the mirror 33 in the order "light-projecting component 11 to light-receiving component 12" as one goes from the flat component 331 side of the mirror 33 to the curved component 332 side of the mirror 33.

With the sensor 1 in this state, light that is irradiated from the light-projecting component 11 follows the projected light optical path 14 and is reflected by the mirror 33. Of this irradiated light, only that portion which is irradiated along the received light optical path 15, i.e., only that portion which irradiates the overlapping zone 16—at which the projected light optical path 14 overlaps the received light optical path 15—is reflected. This reflected light is reflected by the mirror 33 and is incident on the light-receiving surface 121, being received by the light-receiving component 12 (see FIG. 3 (a)).

Next, when carrying out detection with respect to a zone which is distant from this automatic door sensor 1, the light-projecting and light-receiving components 11, 12 are both rotated from the flat component 331 of the mirror 33 toward the curved component 332 thereof. At such time, the light-receiving surface 121 of the light-receiving component 12 is disposed so as to be directed at the curved component 332 side of the mirror 33, and the light-projecting surface 111 of the light-projecting component 11 is disposed so as to be directed at the flat component 331 side of the mirror 33 (see FIG. 3 (b)).

With the sensor 1 in this state, light that is irradiated from the light-projecting component 11 follows the projected light optical path 14 and is reflected by the mirror 33. Of this irradiated light, only that portion which is irradiated along the received light optical path 15, i.e., only that portion which irradiates the overlapping zone 16—at which the projected light optical path 14 overlaps the received light optical path 15—is reflected. This reflected light is reflected by the mirror 33 and is incident on the light-receiving surface 121, being received by the light-receiving component 12. At such time, the light incident on the light-receiving surface 121 is altered by the mirror 33, and the received light optical path 15 undergoes alteration as indicated in FIG. 3 (b).

Fourth Embodiment

The automatic door sensor of the fourth embodiment of the present invention differs from the automatic door sensor of the foregoing first embodiment only with respect to the optical path varying means, and the other constitutions thereof are identical in other respects. A description of the present fourth embodiment will therefore be confined to the optical path varying means with respect to the manner in which it differs from the automatic door sensor of the first embodiment, and like constituents will be assigned like reference numerals and a description thereof will be omitted.

As shown in FIG. 4, a light-projecting component 11 and a light-receiving component 12 are arranged at the automatic door sensor 1. Note also that detection conditions are such that constant density is maintained in the light irradiated from the light-projecting surface 111 of the light-projecting component 11.

Furthermore, this automatic door sensor 1 may be provided with optical path varying means for varying a projected light optical path(s) 14 and/or a received light optical path(s) 15 so as to physically vary an overlapping zone(s) 16.

As shown in FIG. 4, the present optical path varying means is such that a rotatable shaft 43 for rotating the light-projecting component 11 and the light-receiving component 12 is disposed between the light-projecting component 11 and the light-receiving component 12. Moreover, when carrying out detection with respect to zone(s) distant from this automatic door sensor 1, the light-projecting and light-receiving components 11, 12 are rotated in the same direction (counterclockwise in FIG. 4 (*a*)), with the rotatable shaft 43 serving as an axis of rotation. Furthermore, the light-projecting and light-receiving components 11, 12 are both rotated in directions such as would tend to increase the degree to which the light-projecting surface 111 and the light-receiving surface 121 face each other.

Next, with reference to FIG. 4, an operation of the automatic door sensor 1 when carrying out detection with respect to a zone which is proximate to this automatic door sensor 1, and an operation of the automatic door sensor 1 when carrying out detection with respect to a zone which is distant from this automatic door sensor 1 will be described.

First, when carrying out detection with respect to a zone which is proximate to this automatic door sensor 1, the light-projecting component 11 and the light-receiving component 12 are disposed so as to cause the light-projecting and light-receiving surfaces 111, 121 to face the same direction.

With the sensor 1 in this state, light that is irradiated from the light-projecting component 11 follows the projected light optical path 14. Of this irradiated light, only that portion which is irradiated along the received light optical path 15, i.e., only that portion which irradiates the overlapping zone 16—at which the projected light optical path 14 overlaps the received light optical path 15—is reflected. This reflected light is incident on the light-receiving surface 121, being received by the light-receiving component 12 (see FIG. 4 (*a*)).

Next, when carrying out detection with respect to a zone which is distant from this automatic door sensor 1, the light-projecting and light-receiving components 11, 12 are rotated in the same direction, with the rotatable shaft 43 serving as an axis of rotation (see the rotatable shaft 43 in FIG. 4 (*a*)). Furthermore, the light-projecting and light-receiving components 11, 12 are both rotated in directions such as would tend to increase the degree to which the light-projecting and light-receiving surfaces 111, 121 face each other (see FIG. 4 (*b*)).

With the sensor 1 in this state, light that is irradiated from the light-projecting component 11 follows the projected light optical path 14. As shown in FIG. 4 (*b*), the irradiated light at this time is such that projected light optical path 14 is formed in a direction which will bring it toward the received light optical path 15. Of this irradiated light, only that portion which is irradiated along the received light optical path 15, i.e., only that portion which irradiates the overlapping zone 16—at which the projected light optical path 14 overlaps the received light optical path 15—is reflected. This reflected light is incident on the light-receiving surface, being received by the light-receiving component 12 (see FIG. 4 (*b*)).

Note also that whereas in the present fourth embodiment, when carrying out detection with respect to zone(s) distant from this automatic door sensor 1, the light-projecting and light-receiving components 11, 12 are, by means of the rotatable shaft 43, both rotated in directions such as would tend to increase the degree to which the light-projecting surface 111 and the light-receiving surface 121 face each other, the present invention is not limited thereto. It is possible to rotate only either the light-projecting component 11 or the light-receiving component 12.

As described above, with reference to the foregoing first through fourth embodiments, sensors in accordance with the embodiment(s) of the present invention make it possible to vary protected zone(s) at which detection of person(s) traveling therethrough and/or other such object(s) are detected and make it possible to carry out detection of object(s) entering protected zone(s) such that the detection thereof is carried out with equivalent sensitivity with respect to projected and/or received light across all protected zones despite any varying of the protected zone(s).

That is, with sensors in accordance with the embodiment(s) of the present invention, because optical path varying means may be provided, an adjustment of sensitivity with respect to projected and/or received light may be carried out by increasing the extent(s) of the overlapping zone(s) when carrying out detection with respect to distant zone(s) and/or decreasing the extent(s) of the overlapping zone(s) when carrying out detection with respect to proximate zone(s). That is, because light density is high when carrying out detection with respect to zone(s) proximate to such sensor(s), adjustment of optical sensitivity may be carried out so as to decrease the extent(s) of the overlapping zone(s); and because light density is low when carrying out detection with respect to zone(s) distant from such sensor(s), adjustment of optical sensitivity may be carried out so as to increase the extent(s) of the overlapping zone(s). As a result, it will be possible to carry out detection of object(s) entering overlapping zone(s) such that the detection thereof is carried out with equivalent sensitivity with respect to projected and/or received light across all overlapping zones despite any varying of the overlapping zone(s).

Furthermore, because optical path varying means may physically vary the overlapping zone(s), it is possible to reduce manufacturing cost as compared with the alternative of electrically varying the same, as there is no need to develop and provide additional controller(s) for varying the overlapping zone(s).

Furthermore, it is possible to eliminate the need to provide additional member(s) that might be arranged therein only with difficulty. As a result, it is possible to reduce the parts count of the sensor and/or simplify the structure of the sensor.

What is claimed is:

1. A sensor comprising:
    one or more light-projecting components each having a light-projecting surface, said one or more light-projecting components being operable to irradiate light from said light-projecting surface; and
    one or more light-receiving components each having a light-receiving surface, said one or more light-receiving components being operable to receive at least a portion of the light irradiated from at least one of said one or more light-projecting components, wherein the received light is incident on said one or more light-receiving components receiving the light after the light has been reflected; wherein:
    said sensor is operable to detect one or more objects in one or more overlapping zones at which at least one projected light optical path of the light irradiated by at least one of said one or more light-projecting components at least partially overlaps at least one received light optical path of the light incident on at least one of said one or more light-receiving components;

said sensor further comprises one or more optical path varying means for varying at least one of the at least one projected light optical path and the at least one received light optical path so as to physically vary at least one of the one or more overlapping zones; and at least one of said optical path varying means carries out an adjustment of optical sensitivity by at least one of increasing at least one extent of at least one of the one or more overlapping zones when said sensor carries out detection with respect to at least one distant zone, and decreasing at least one extent of at least one of the one or more overlapping zones when said sensor carries out detection with respect to at least one proximate zone;

at least one of said optical path varying means comprises one or more translucent curved bodies disposed in at least one of the at least one projected optical path and the at least one received light optical path;

at least one of said one or more translucent curved bodies comprises one or more flat components and one or more curved components formed in a continuous fashion;

at least one of said one or more light-projecting components and at least one of said one or more light-receiving components are arrayed in a same order as at least one of said one or more flat components and at least one of said one or more curved components formed in the continuous fashion; and when said sensor carries out detection with respect to at least one distant zone, at least one of said one or more light-projecting components and at least one of said one or more light-receiving components are made to at least one of move and rotate from at least one of said one or more flat and toward at least one of said one or more curved components while maintaining a distance between at least a portion of said light-projecting and light-receiving surfaces of said one or more light-projecting and light-receiving components.

2. A sensor comprising:

one or more light-projecting components each having a light-projecting surface, said one or more light-projecting components being operable to irradiate light from said light-projecting surface; and one or more light-receiving components each having a light-receiving surface, said one or more light-receiving components being operable to receive at least a portion of the light irradiated from at least one of said one or more light-projecting components, wherein the received light is incident on said one or more light-receiving components receiving the light after the light has been reflected; wherein:

said sensor is operable to detect one or more objects in one or more overlapping zones at which at least one projected light optical path of the light irradiated by at least one of said one or more light-projecting components at least partially overlaps at least one received light optical path of the light incident on at least one of said one or more light-receiving components;

said sensor further comprises one or more optical path varying means for varying at least one of the at least one projected light optical path and the at least one received light optical path so as to physically vary at least one of the one or more overlapping zones; and at least one of said optical path varying means carries out an adjustment of optical sensitivity by at least one of increasing at least one extent of at least one of the one or more overlapping zones when said sensor carries out detection with respect to at least one distant zone, and decreasing at least one extent of at least one of the one or more overlapping zones when said sensor carries out detection with respect to at least one proximate zone;

at least one of said optical path varying means comprises one or more prismatic bodies disposed in at least one of the at least one projected optical path and the at least one received light optical path;

at least one of said one or more prismatic bodies presents a gradually increasing angle from at least one side thereof to at least one other side thereof;

at least one of said one or more light-projecting components and at least one of said one or more light-receiving components are arrayed in same order as the at least one side thereof and the at least one other side thereof; and when said sensor carries out detection with respect to at least one distant zone, at least one of said one or more light-projecting components and at least one of said one or more light-receiving components are made to at least one of move and rotate from the at least one side and toward the at least another side while maintaining a distance between at least a portion of said light-projecting and light-receiving surfaces of said one or more light-projecting and light-receiving components.

3. A sensor comprising:

one or more light-projecting components each having a light-projecting surface, said one or more light-projecting components being operable to irradiate light from said light-projecting surface; and one or more light-receiving components each having a light-receiving surface, said one or more light-receiving components being operable to receive at least a portion of the light irradiated from at least one of said one or more light-projecting components, wherein the received light is incident on said one or more light-receiving components receiving the light after the light has been reflected: wherein:

said sensor is operable to detect one or more objects in one or more overlapping zones at which at least one projected light optical path of the light irradiated by at least one of said one or more light-projecting components at least partially overlaps at least one received light optical path of the light incident on at least one of said one or more light-receiving components;

said sensor further comprises one or more optical path varying means for varying at least one of the at least one projected light optical path and the at least one received light optical path so as to physically vary at least one of the one or more overlapping zones;

at least one of said optical path varying means carries out an adjustment of optical sensitivity by at least one of increasing at least one extent of at least one of the one or more overlapping zones when said sensor carries out detection with respect to at least one distant zone, and decreasing at least one extent of at least one of the one or more overlapping zones when said sensor carries out detection with respect to at least one proximate zone;

at least one of said optical path varying means comprises one or more mirror bodies disposed in at least one of the at least one projected optical path and the at least one received light optical path;

at least one of said one or more mirror bodies comprises one or more flat components and one or more curved components formed in a continuous fashion;

at least one of said one or more light-projecting components and at least one of said one or more light-receiving components are arrayed in a same order as at least one of said one or more flat components and at least one of said one or more curved components formed in the continuous fashion; and when said sensor carries out detection with respect to at least one distant zone, at least one of said one or more light-projecting components and at least one of said one or more light-receiving components are made to at least one of move and rotate from at least one of said one or more flat components and toward at least one of said one or more curved while maintaining a distance between at least a portion of said light-projecting and light-receiving surfaces of said one or more light-projecting and light-receiving components.

4. A sensor comprising:

one or more light-projecting components each having a light-projecting surface, said one or more light-projecting components being operable to irradiate light from said light-projecting surface; and one or more light-receiving components each having a light-receiving surface said one or more light-receiving components being operable to receive at least a portion of the light irradiated from at least one of said one or more light-projecting components, wherein the received light is incident on said one or more light-receiving components receiving the light after the light has been reflected; wherein:

said sensor is operable to detect one or more objects in one or more overlapping zones at which at least one projected light optical path of the light irradiated by at least one of said one or more light-projecting components at least partially overlaps at least one received light optical path of the light incident on at least one of said one or more light-receiving components;

said sensor further comprises one or more optical path varying means for varying at least one of the at least one projected light optical path and the at least one received light optical path so as to physically vary at least one of the one or more overlapping zones;

at least one of said optical path varying means carries out an adjustment of optical sensitivity by at least one of increasing at least one extent of at least one of the one or more overlapping zones when said sensor carries out detection with respect to at least one distant zone, and decreasing at least one extent of at least one of the one or more overlapping zones when said sensor carries out detection with respect to at least one proximate zone;

at least one of said optical path varying means comprises one or more rotatable shafts for rotating at least one of said one or more light-projecting components and at least one of said one or more light-receiving components said one or more rotatable shafts being disposed between at least one of said one or more light-projecting components and at least one of said one or more light-receiving components; and when said sensor carries out detection with respect to at least one distant zone, at least one of said one or more light-projecting components and/or at least one of said one or more light-receiving components is/are rotated in at least one direction which would tend to increase the degree to which said light-projecting surface of said at least one of said one or more light-projecting components said light-receiving surface of said at least one of said one or more light-receiving components.

* * * * *